(12) United States Patent
Blumer et al.

(10) Patent No.: US 8,109,711 B2
(45) Date of Patent: Feb. 7, 2012

(54) TETHERED AUTONOMOUS AIR VEHICLE WITH WIND TURBINES

(75) Inventors: Eric Blumer, Scottsdale, AZ (US); John Thurston, Mesa, AZ (US); Paul Wingett, Mesa, AZ (US); Louie Timothy Gaines, Phoenix, AZ (US); Yogendra Yogi Sheoran, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 609 days.

(21) Appl. No.: 12/349,868

(22) Filed: Jan. 7, 2009

(65) Prior Publication Data

US 2010/0013226 A1 Jan. 21, 2010

Related U.S. Application Data

(60) Provisional application No. 61/082,031, filed on Jul. 18, 2008.

(51) Int. Cl.
| | |
|---|---|
| *F03B 15/06* | (2006.01) |
| *F03B 13/00* | (2006.01) |
| *F03B 7/00* | (2006.01) |
| *F03B 17/06* | (2006.01) |
| *F03D 7/00* | (2006.01) |
| *F03D 11/04* | (2006.01) |
| *F03D 9/00* | (2006.01) |
| *F01D 25/28* | (2006.01) |
| *F01D 15/00* | (2006.01) |
| *F01D 15/12* | (2006.01) |
| *F04D 29/60* | (2006.01) |
| *B63H 1/38* | (2006.01) |

(52) U.S. Cl. ........... 415/2.1; 415/4.1; 415/7; 415/121.3; 416/85; 416/86; 416/146 R; 416/DIG. 6

(58) Field of Classification Search ............... 415/2.1, 415/4.1, 7, 121.3; 416/85, 86, 146 R, DIG. 6
See application file for complete search history.

(56) References Cited

U.S. PATENT DOCUMENTS 3,954,236 A * 5/1976 Brown ............... 244/155 R
(Continued)

FOREIGN PATENT DOCUMENTS

EP 1868008 12/2007
(Continued)

OTHER PUBLICATIONS

Thompson, Kalee "Ten Times the Turbine," http://www.popsci.com/scitech/article/2008-5/ten-times-turnine, May 13, 2008. Popular Science, May 2008, printed Jan. 6, 2009, with comments.

(Continued)

*Primary Examiner* — David Zarneke
(74) *Attorney, Agent, or Firm* — Ingrassia Fisher & Lorenz, P.C.

(57) ABSTRACT

A wind turbine energy conversion device that can take advantage of the higher speed and more persistent winds at higher altitudes is hereinafter disclosed. The wind turbine energy conversion device includes an unmanned aerial vehicle (UAV) connected to one end of a tether (which may include multiple shorter tethers), the other end being connected to a terrestrial anchorage point. The UAV flies at altitudes where wind speeds can reach 40 mph or higher. The UAV comprises a flying wing with one or more trailing wind power turbines and flies airborne maneuvers designed to increase relative wind speed up to about four times the true wind speed.

20 Claims, 11 Drawing Sheets

U.S. PATENT DOCUMENTS

| | | | |
|---|---|---|---|
| 4,076,190 A * | 2/1978 | Lois | 244/153 R |
| 4,084,102 A * | 4/1978 | Fry et al. | 290/55 |
| 4,166,596 A * | 9/1979 | Mouton et al. | 244/30 |
| 4,251,040 A | 2/1981 | Loyd | |
| 4,285,481 A * | 8/1981 | Biscomb | 244/33 |
| 4,309,006 A * | 1/1982 | Biscomb | 244/33 |
| 4,486,669 A * | 12/1984 | Pugh | 290/44 |
| 4,491,739 A * | 1/1985 | Watson | 290/44 |
| 4,572,962 A * | 2/1986 | Shepard | 290/55 |
| 4,659,940 A * | 4/1987 | Shepard | 290/55 |
| 4,664,340 A | 5/1987 | Jackson | |
| 4,748,808 A * | 6/1988 | Hill | 60/398 |
| 4,832,571 A | 5/1989 | Carrol | |
| 5,040,948 A * | 8/1991 | Harburg | 416/85 |
| 5,150,857 A | 9/1992 | Moffitt et al. | |
| 5,152,478 A | 10/1992 | Cycon et al. | |
| 5,295,643 A | 3/1994 | Ebbert et al. | |
| 5,575,438 A | 11/1996 | McGonigle et al. | |
| 5,607,122 A | 3/1997 | Hicks et al. | |
| 5,695,153 A | 12/1997 | Britton et al. | |
| 6,072,245 A * | 6/2000 | Ockels | 290/55 |
| 6,422,508 B1 | 7/2002 | Barnes | |
| 6,450,445 B1 | 9/2002 | Moller | |
| 6,502,787 B1 | 1/2003 | Barrett | |
| 6,523,781 B2 * | 2/2003 | Ragner | 244/153 R |
| 6,575,402 B1 | 6/2003 | Scott | |
| 6,588,701 B2 | 7/2003 | Yavnai | |
| 6,604,706 B1 | 8/2003 | Bostan | |
| 6,616,402 B2 | 9/2003 | Selsam | |
| 6,622,090 B2 | 9/2003 | Lin | |
| 6,665,594 B1 | 12/2003 | Armstrong | |
| 6,691,949 B2 | 2/2004 | Plump et al. | |
| 6,694,228 B2 | 2/2004 | Rios | |
| 6,712,312 B1 | 3/2004 | Kucik | |
| 6,721,646 B2 | 4/2004 | Carroll | |
| 6,781,254 B2 | 8/2004 | Roberts | |
| 6,813,559 B1 | 11/2004 | Bodin et al. | |
| 6,847,865 B2 | 1/2005 | Carroll | |
| 6,873,886 B1 | 3/2005 | Mullen et al. | |
| 6,979,171 B2 * | 12/2005 | Lauritsen | 415/4.3 |
| 7,000,883 B2 | 2/2006 | Mercadal et al. | |
| 7,032,861 B2 | 4/2006 | Sanders, Jr. et al. | |
| 7,044,422 B2 | 5/2006 | Bostan | |
| 7,129,596 B2 * | 10/2006 | Macedo | 290/55 |
| 7,158,877 B2 | 1/2007 | Carlsson et al. | |
| 7,183,663 B2 * | 2/2007 | Roberts et al. | 290/44 |
| 7,228,227 B2 | 6/2007 | Speer | |
| 7,231,294 B2 | 6/2007 | Bodin et al. | |
| 7,249,732 B2 | 7/2007 | Sanders, Jr. et al. | |
| 7,289,906 B2 | 10/2007 | Van Der Merwe et al. | |
| 7,299,130 B2 | 11/2007 | Mulligan et al. | |
| 7,302,316 B2 | 11/2007 | Beard et al. | |
| 7,317,261 B2 | 1/2008 | Rolt | |
| 7,335,000 B2 | 2/2008 | Ferguson | |
| 7,352,075 B2 | 4/2008 | Willey et al. | |
| 7,602,077 B2 * | 10/2009 | Ferguson | 290/55 |
| 7,775,761 B2 * | 8/2010 | Ferguson | 415/7 |
| 7,859,126 B2 * | 12/2010 | Ferguson | 290/44 |
| 2004/0094662 A1 | 5/2004 | Sanders, Jr. et al. | |
| 2004/0129828 A1 | 7/2004 | Bostan | |
| 2005/0082421 A1 | 4/2005 | Perlo et al. | |
| 2005/0165517 A1 | 7/2005 | Reich | |
| 2006/0049304 A1 | 3/2006 | Sanders, Jr. et al. | |
| 2006/0102780 A1 | 5/2006 | Parks | |
| 2006/0106506 A1 | 5/2006 | Nichols et al. | |
| 2006/0192047 A1 | 8/2006 | Goossen | |
| 2006/0231675 A1 | 10/2006 | Bostan | |
| 2006/0287824 A1 | 12/2006 | Lin | |
| 2007/0018052 A1 | 1/2007 | Eriksson | |
| 2007/0034738 A1 | 2/2007 | Sanders, Jr. et al. | |
| 2007/0051848 A1 | 3/2007 | Mantych et al. | |
| 2007/0069083 A1 | 3/2007 | Shams et al. | |
| 2007/0129855 A1 | 6/2007 | Coulmeau | |
| 2007/0189899 A1 | 8/2007 | Serpa | |
| 2007/0193650 A1 | 8/2007 | Eannati | |
| 2007/0200027 A1 | 8/2007 | Johnson | |
| 2007/0221790 A1 | 9/2007 | Goossen | |
| 2007/0228214 A1 | 10/2007 | Horak | |
| 2007/0244608 A1 | 10/2007 | Rath et al. | |
| 2007/0262195 A1 | 11/2007 | Bulaga et al. | |
| 2007/0271032 A1 | 11/2007 | Cheng et al. | |
| 2007/0295298 A1 | 12/2007 | Mark | |
| 2008/0023587 A1 | 1/2008 | Head et al. | |
| 2008/0035786 A1 | 2/2008 | Bilyk et al. | |
| 2008/0059068 A1 | 3/2008 | Strelow et al. | |
| 2008/0071431 A1 | 3/2008 | Dockter et al. | |
| 2008/0078865 A1 | 4/2008 | Burne | |
| 2008/0112807 A1 | 5/2008 | Uphues et al. | |

FOREIGN PATENT DOCUMENTS

| | | |
|---|---|---|
| EP | 1767453 | 6/2008 |
| WO | 0015497 | 3/2000 |
| WO | 2004002821 | 1/2004 |
| WO | 2007058643 | 5/2007 |

OTHER PUBLICATIONS

Loyd, M.; Crosswind Kite Power, J. Energy, vol. 4, No. 3, Article No. 80/4075; American Institute of Aeronautics and Astronautics, Inc., 1980.

* cited by examiner

TETHERED AUTONOMOUS AIR VEHICLE WITH WIND TURBINES

CROSS-REFERENCE TO RELATED APPLICATIONS

The present application claims priority to U.S. Provisional Patent Application No. 61/082,031 filed on Jul. 18, 2008 entitled "Tethered Autonomous Air Vehicle with Wind Turbine", the entire contents of which are incorporated herein for all purposes.

FIELD

The present invention relates to sustainable energy sources, and more particularly to a tethered air vehicle having at least one wind turbine for energy conversion.

BACKGROUND

Movement of air in the atmosphere from areas of high pressure to areas of low pressure is a source of clean, sustainable energy for meeting a portion of the world's growing energy needs. Commercial utilization of wind energy has steadily increased over the past few decades, but is well shy of providing a significant percentage of global electrical power demand. Ground-based wind turbines have grown in size from the 100 kilowatt class to the multi-megawatt class. However, the amortized cost per kilowatt-hour for terrestrial wind turbines has recently stagnated. New, larger wind turbines require extremely large cranes for tower, nacelle, and blade installation. The rotor blades must be transported in sections on long flat bed trucks.

Modern large terrestrial wind turbines utilize either extremely heavy step-up gearboxes that have input torques in the millions of pound-feet and drive one or more generators at moderate speed, or do not utilize a gearbox and directly drive an extremely large and heavy generator at low speed. Gearbox reliability is low, and maintenance costs are high. These factors have set a cannot-be-lower-than value for the cost per kilowatt-hour for terrestrial wind power systems.

Therefore, it would be desirable to provide an effective wind turbine energy conversion device that is relatively inexpensive to manufacture, deploy, and maintain. It would also be desirable for the device to be able to be utilized in locations that are impractical for ground-based wind turbines.

SUMMARY

It is an object of the present invention to provide a wind turbine energy conversion device that can take advantage of the higher speed and more persistent winds at altitudes above traditional ground-based wind turbines. Equipment for extracting wind energy at higher levels of the atmosphere can be made significantly smaller, lighter, and more reliable than terrestrial wind power equipment.

In an apparatus according to a first embodiment, an unmanned aerial vehicle (UAV) is connected to one end of a tether, the other end being connected to a terrestrial anchorage point on land or sea. The UAV flies at altitudes where wind speeds are typically 40 mph or higher. The UAV comprises a flying wing with one trailing wind turbine. An appreciable amount of electric power is generated by performing in-flight maneuvers that serve to increase the relative wind speed to about four times the true wind speed. Equipment coupled to the terrestrial anchorage point receives the generated power through conductors embedded within the tether. A lighter-than-air object may be included, attached along the tether, to provide lift to a portion of the tether.

In an apparatus according to a second embodiment, the UAV comprises a flying wing with two trailing wind turbines.

In an apparatus according to a third embodiment, the UAV comprises a flying wing with two trailing wind turbines and one leading wind turbine.

In an apparatus according to a fourth embodiment, the UAV comprises a flying wing with a single ducted wind turbine.

In an apparatus according to a fifth embodiment, the UAV comprises a flying wing with a single leading wind turbine.

In an apparatus according to a sixth embodiment, the UAV comprises a flying wing with a single trailing wind turbine and spool motors for adjusting the effective tether attachment point.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

DETAILED DESCRIPTION OF PRESENTLY PREFERRED EMBODIMENTS

Wind power per unit area increases by the cube of the wind speed. Usable power potentially available in the wind is described by the following equation:

$$P = \frac{1}{2}\alpha\rho\pi r^2 v^3, \quad \text{(Equation 1)}$$

where P=power in watts, α=an efficiency factor determined by the design of the turbine, ñ=mass density of air in kilograms per cubic meter, r=radius of the wind turbine in meters, and v=velocity of the air in meters per second.

The present invention exploits the fact that average wind speed increases and becomes more persistent as altitude increases. Therefore, if wind turbines can be placed at altitude, they can be made smaller than terrestrial wind turbines for the same power output due to the significantly higher average wind speeds as altitude increases.

As an example, at ground level, a wind turbine with 1 megawatt power output has a rotor diameter of approximately 210 feet and a gearbox input torque of 320,000 lb-ft. At altitude, a wind turbine with the same 1 megawatt power output has a rotor diameter of approximately 18 feet and a gearbox input torque of 7,800 lb-ft. The 18-foot diameter rotor has a rotational speed of approximately 900 rpm, compared to 24 rpm for the ground-based turbine. Because the rotor operates at higher speed and lower torque, the step-up gearbox is significantly lighter and more compact than the gearbox for the ground-based wind turbine. The output speed of the compact gearbox is approximately 15,000 rpm. This high output speed drives a light weight, compact wound field generator that produces 1 megawatt of continuous electrical power.

Figure 1:
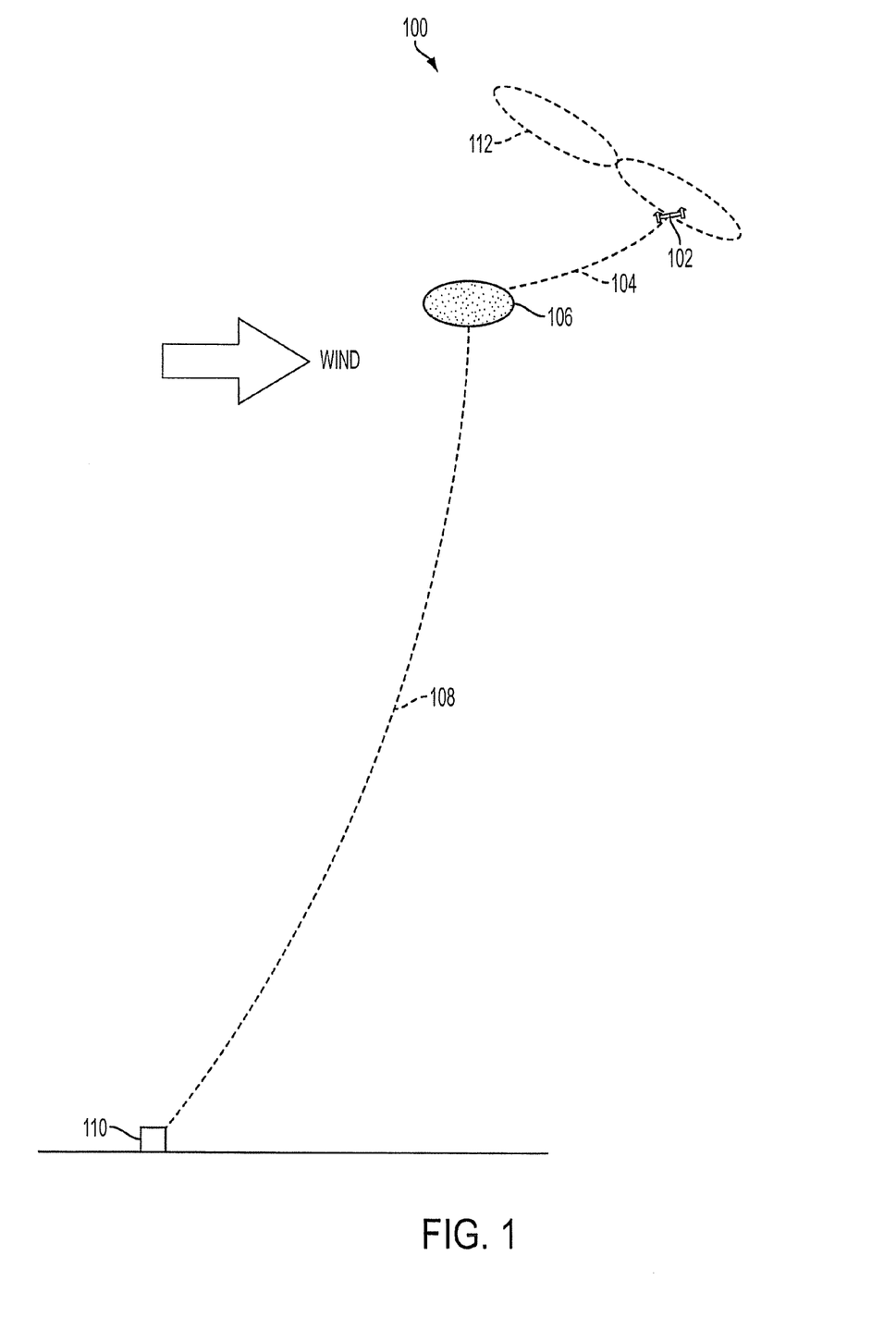
FIG. 1 illustrates a system for energy conversion using a tethered air vehicle having at least one wind turbine.

FIG. 1 illustrates a system 100 for energy conversion using an unmanned and fully autonomous tethered air vehicle 102 having at least one wind turbine. Various embodiments of the UAV 102 (with one or more turbines) are illustrated in and described with respect to FIGS. 2 through 7. The UAV 102 is connected by a first tether 104 to an aerostat 106 (i.e. a lighter-than-air object that remains relatively stationary in air). The aerostat 106 is, in turn, connected by a second tether 108 (or a portion of the first tether 104) to a base station 110 (connected to a power distribution system, vehicle, or other device) located on the ground, a sea anchorage point, or other terrestrial object. Additional aerostats may be included, if desired, to assist in supporting the weight of the tether 108, which may approach around 150 lbs. per thousand feet in some embodiments. In addition, more than one tether may be used, as may more than one air vehicle, for any particular configuration. Furthermore, the first and second tethers 104 and 108 may comprise a single tether to which the aerostat 106 is attached (preferably closer to the air vehicle 102 than to the base station 110). In a preferred embodiment, the total tether length (including first and second tethers 104 and 108) is in the range of 10,000 to 40,000 feet or the length necessary to position the UAV at an altitude to achieve a steady wind of at least 40 mph.

The preferred tether construction is a single composite cable comprised of two insulated aluminum conductors and a high-strength fiber such as Spectra® fiber, a polyethylene fiber available from Honeywell International Inc. High voltage transmission minimizes resistive losses. A small amount of resistive heating helps prevent ice buildup as the cable transits altitudes conducive to icing. Electrical losses from the generation point to the ground may be as high as 15%, depending on tether length. The tether is constructed to have an outside diameter of less than ¾ inch for the airborne wind turbine concept described herein. Tether strength must take into account the high vehicle lift created while the vehicle is flying a circular or figure-eight trajectory.

Also shown in FIG. 1 is a trajectory 112 for the air vehicle 102. The trajectory 112 illustrated is a figure-eight trajectory, but a circular trajectory could be flown as well. The figure-eight trajectory is preferable to the simple circular trajectory, because the tether will not wind up. If a circular pattern is flown, a slip mechanism can be incorporated, such as at the point where the main tether joins the harness assembly that is attached to the air vehicle. The figure-eight trajectory 112 is inclined with respect to the ground which enables the UAV to reach speeds that are up to four times faster than the speed of the wind. The majority of the lift generated by the UAV tensions the tether, but a significant portion of lift is a forward component that accelerates the UAV to true airspeeds faster than the prevailing wind speed. The figure-eight pattern 112 occurs when the air vehicle reverses the direction of turn during the downward portion of the trajectory. In a preferred embodiment, the air vehicle 102 has a flight computer that controls surfaces on the air vehicle 102 to maintain such a trajectory and to keep the tether 104 taut. In one example, each loop of the figure-eight trajectory has an approximate minimum turning radius of around 500 feet. The figure-eight trajectory 112 may also be flown as two separate circular paths. The UAV would traverse the first lobe of the figure-eight in a clockwise direction a number of times, and then traverse the second lobe of the figure-eight in a counterclockwise direction the same number of times. This trajectory would wind the tether while traversing the first lobe, and unwind the tether as the second lobe is traversed.

The UAV 102 is essentially a high lift, high performance flying wing with integral wind turbines. FIGS. 2 through 8 show several configurations of the UAV in accordance with presently preferred embodiments of the present invention. Air vehicles having a wingspan of around 68 feet with a weight of around 3500 lbs., with an average cord length of 10 feet are presently preferred. Though one flying wing is preferred, the UAV may comprise two or more wings as well.

Figure 2:
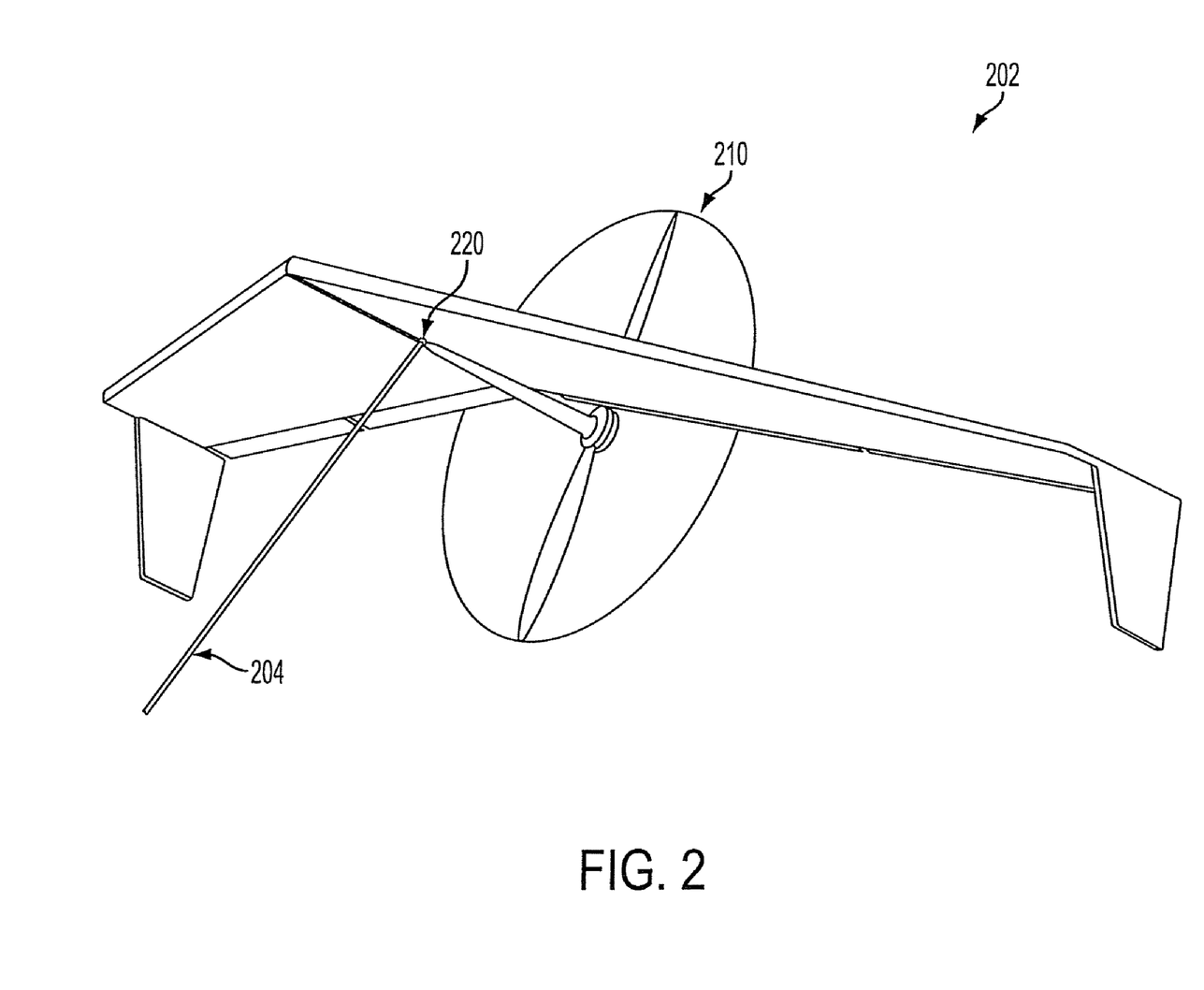
FIG. 2 illustrates a configuration of a UAV in accordance with a first embodiment.

FIG. 2 illustrates a first embodiment of a UAV 202 with one trailing (relative to the direction of travel) wind turbine 210 and a tether 204 attached to tether attachment point 220 located on the body.

Trailing wind turbines are preferred to leading wind turbines for several reasons. First, trailing turbines will have a minimal effect on airflow over the top and bottom airfoil surface and a negligible effect on the lift of the vehicle. A leading turbine will extract energy from the air that passes through the rotor thus decreasing the velocity of the air flowing over the airfoil and reducing the lift. Second, trailing turbines will increase overall stability since the drag created by them is behind the vehicle. Drag which leads the vehicle, as is the case with a leading turbine, will decrease stability. However, a leading turbine could be used to move the center-of-gravity forward of the vehicle and remove the need for a center-of-gravity adjusting ballast. This is illustrated in FIG. 4.

Figure 3:
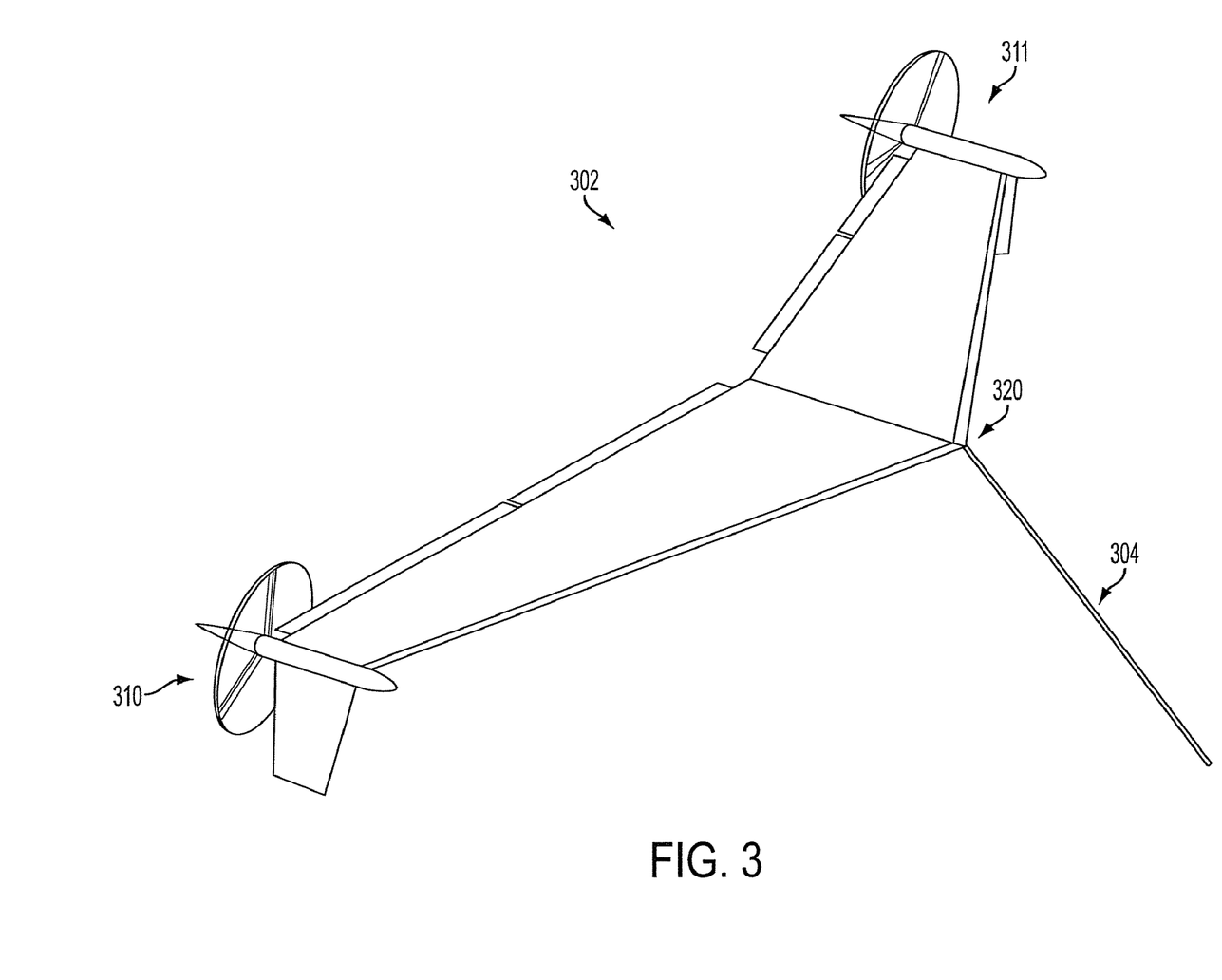
FIG. 3 illustrates a configuration of a UAV in accordance with a second embodiment.

FIG. 3 illustrates a second embodiment of a UAV 302 where there are two trailing wind turbines 310 and 311, located at each wing tip. Tether 304 is attached to tether attachment point 320 located on the underside of the wing.

Figure 4:
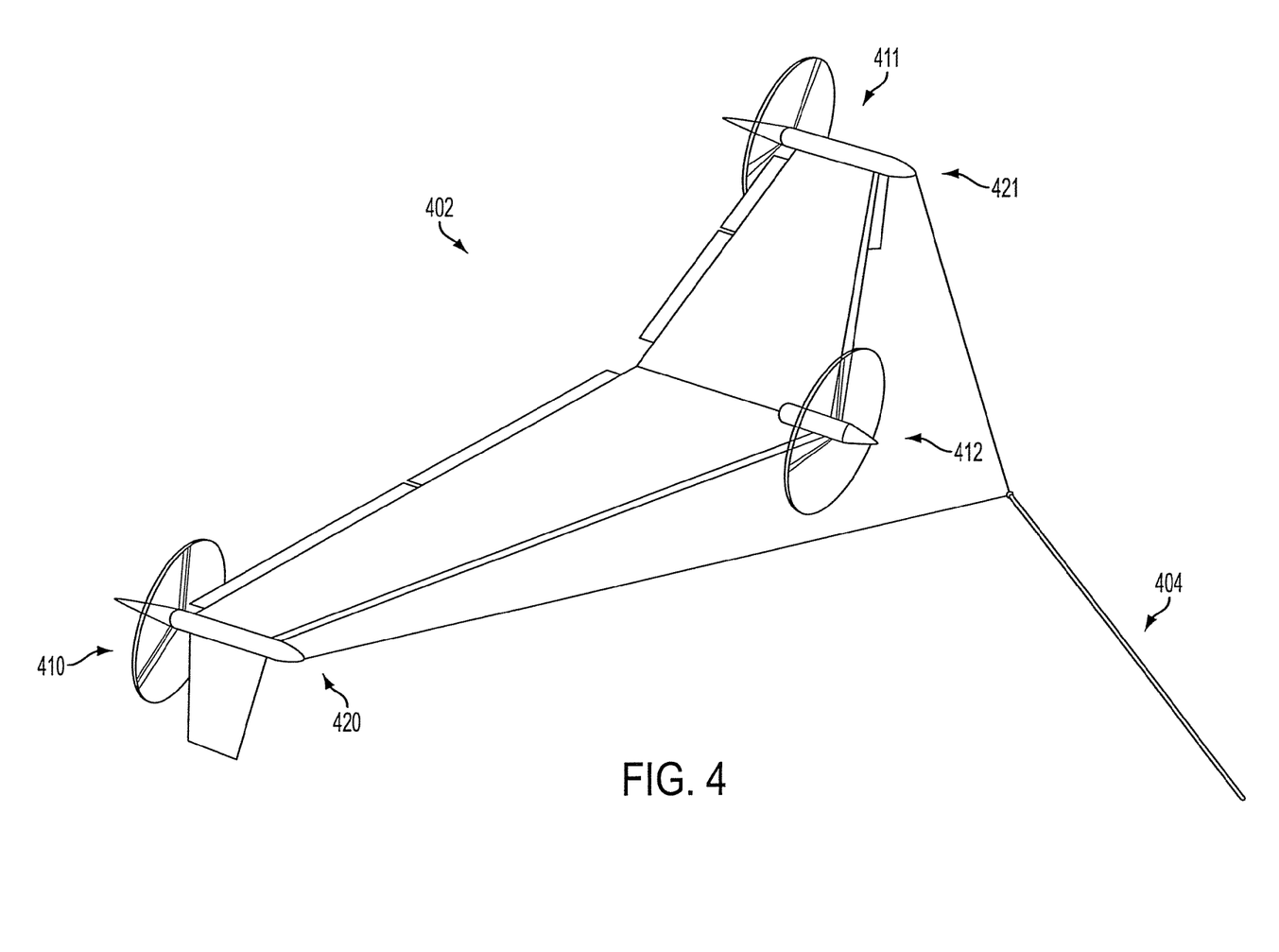
FIG. 4 illustrates a configuration of a UAV in accordance with a third embodiment.

FIG. 4 illustrates a third embodiment of a UAV 402 where there are two trailing wind turbines 410 and 411 and a forward facing wind turbine 412 located at the center of the wing to provide a balancing weight to the front of the wing. This balancing weight increases static stability as well as pitch control. Tether 404 splits into two separate tethers and attaches at attachment points 420 and 421.

Figure 5:
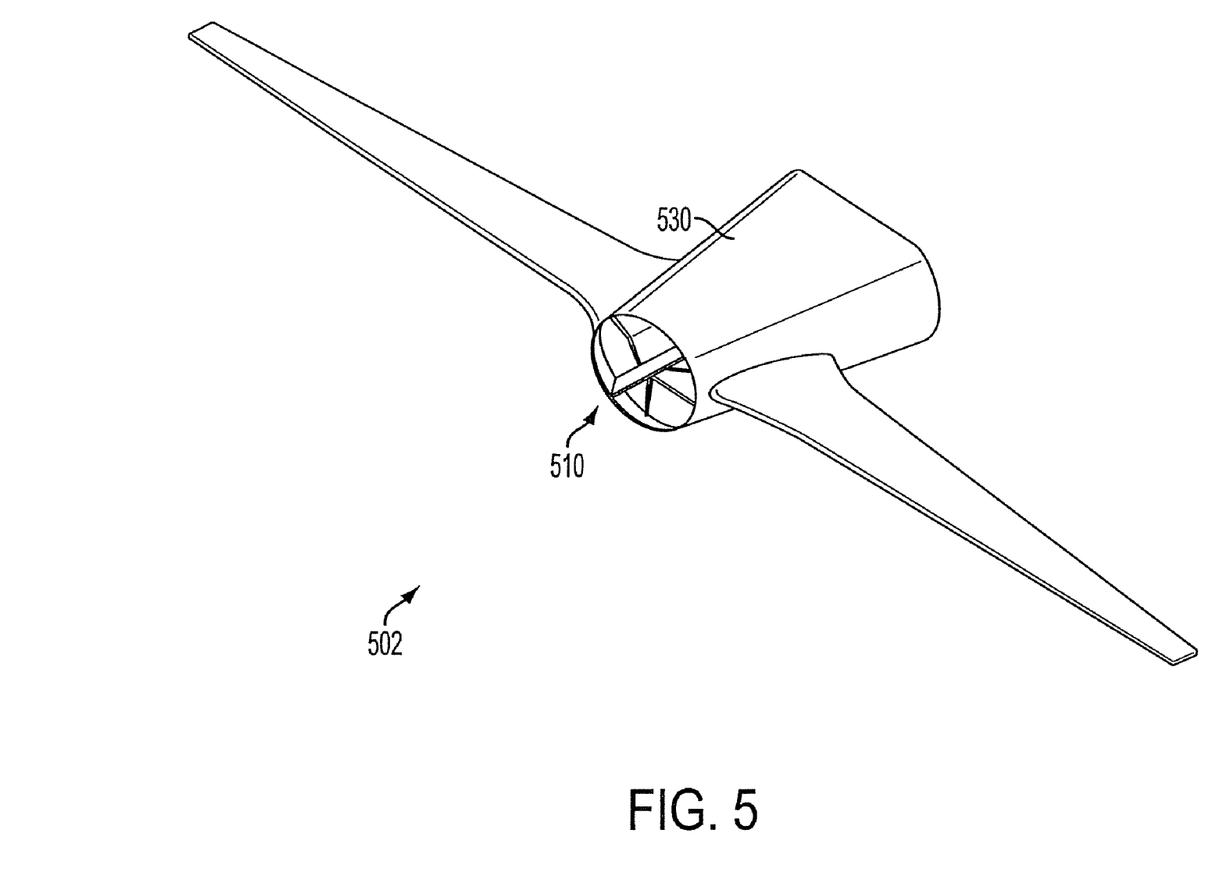
FIG. 5 illustrates a configuration of a UAV in accordance with a fourth embodiment.

FIG. 5 illustrates a fourth embodiment of a UAV 502 in which the vehicle has a single, ducted wind turbine 510. The duct 530 shrouds the turbine 510 and contains a nested diffuser.

Figure 6:
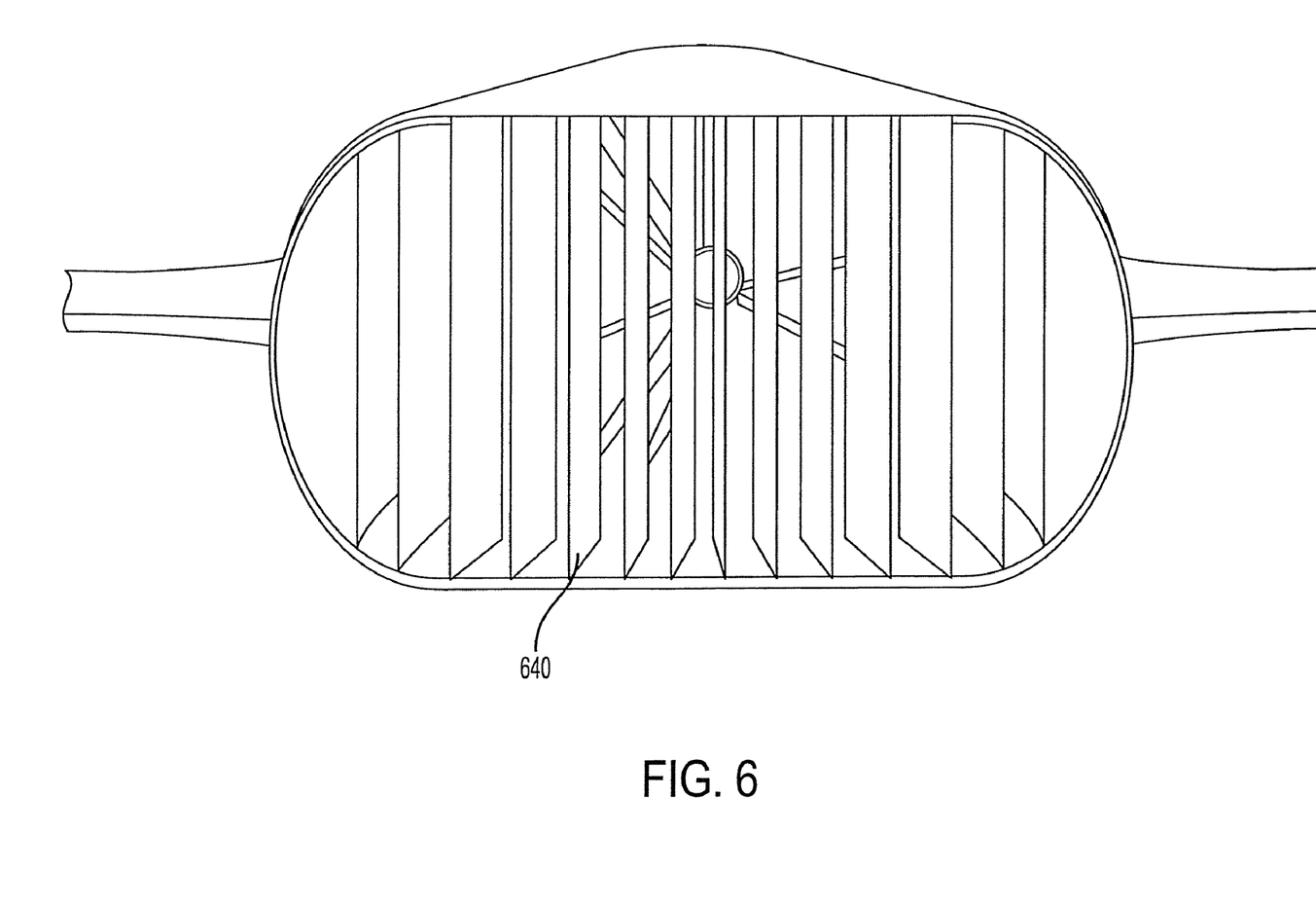
FIG. 6 is a rear view of the fourth embodiment illustrating the nested diffuser.

FIG. 6 is an aft view illustrating the nested diffuser and the multiple vertical partitions 640 that form the diffuser. The nested diffuser is approximately 30 feet or about one-third the length of a conventional 90 foot conical diffuser and has the same performance characteristics. The nested diffuser preferably has a generally rectangular cross-section. The height is constant, but the width increases from inlet to the exit. The nested diffuser and ducted rotor act to increase the airspeed at the rotor face by recovering a significant portion of the pressure drop across the rotor.

Figure 7:
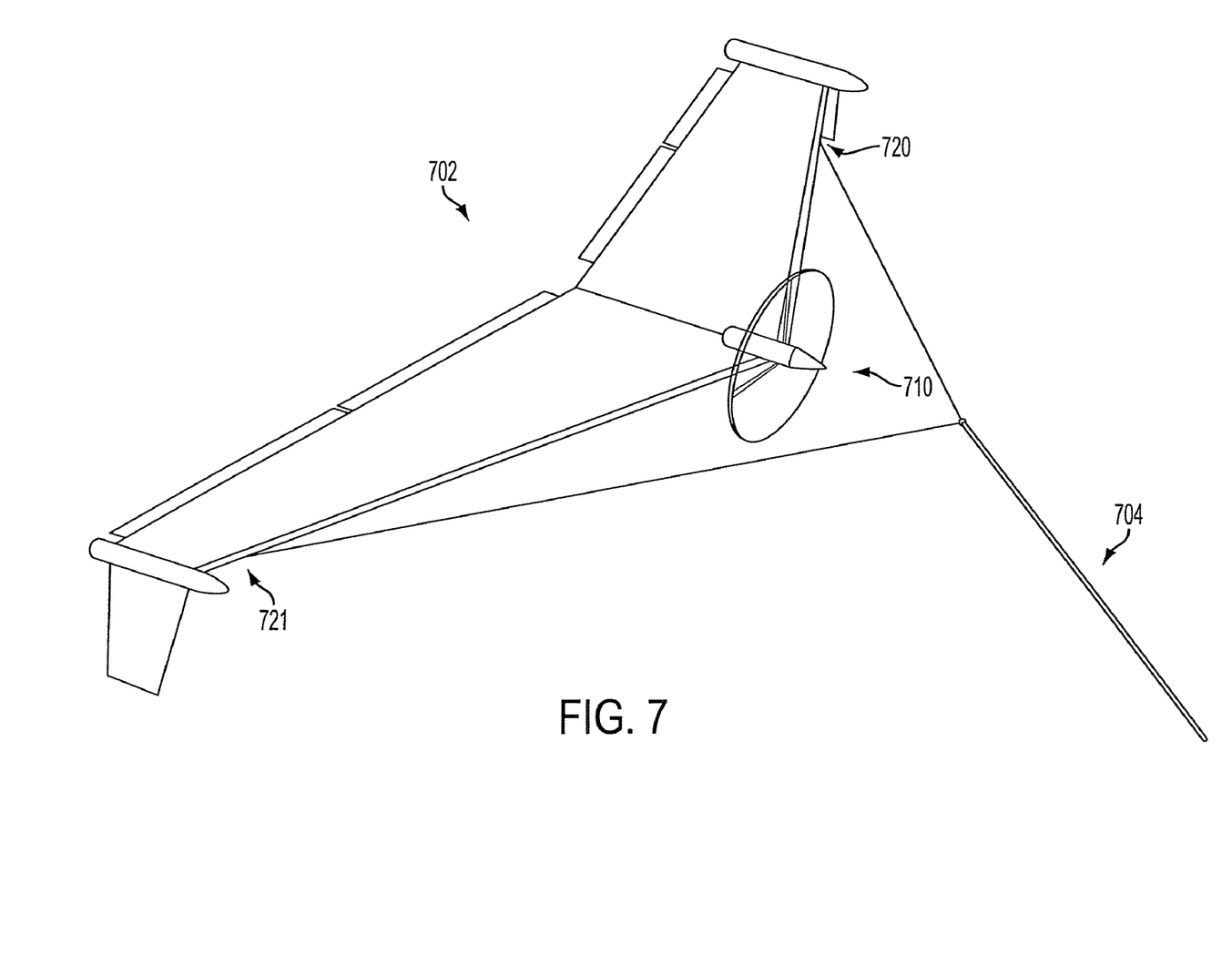
FIG. 7 illustrates a configuration of a UAV in accordance with a fifth embodiment.

FIG. 7 illustrates a fifth embodiment of a UAV 702 in which the vehicle has a single, leading wind turbine 710. Tether 704 splits into two separate tethers and attaches at attachment points 720 and 721.

Figure 8:
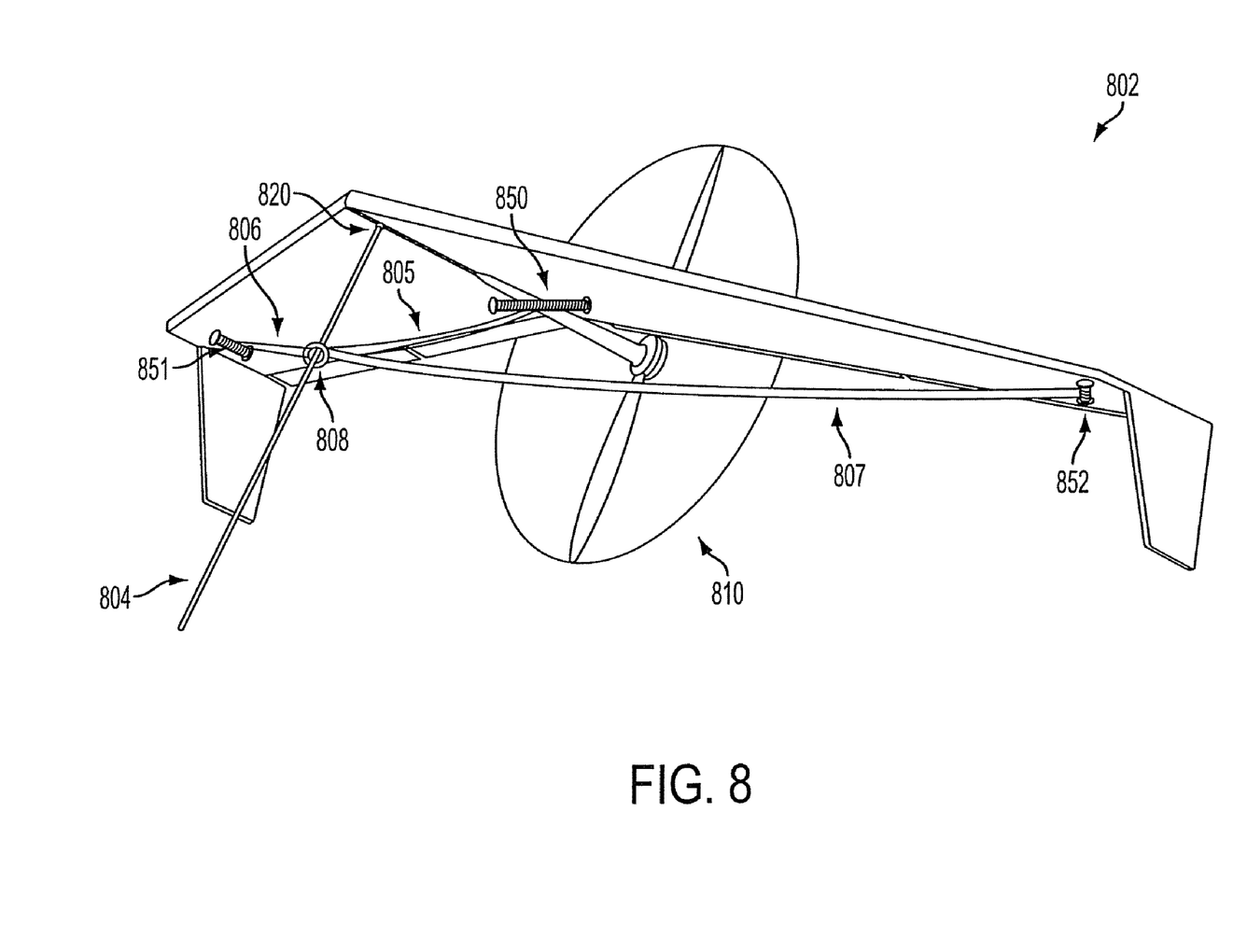
FIG. 8 illustrates a configuration of a UAV in accordance with a sixth embodiment.

In the above embodiments, it may be desirable to have the capacity to adjust the effective attachment point of the tether to the air vehicle in order to provide better in-flight control, especially during the figure-eight maneuvers. FIG. 8 illustrates a sixth embodiment of a UAV 802 corresponding to the UAV 202 in FIG. 2. The UAV wing has main tether attachment point 820 and main tether line 804. A center spool motor 850 is added to the trailing edge of the wing and an adjustable tether line 805 is connected from the spool motor 850 to a static connection point 808 along the main tether line 804. The connection point 808 is only a short distance away from the vehicle, on the order of 5 feet. As the spool motor 850 lengthens or shortens the adjustable line 805 the effective attachment point moves fore and aft. Two additional adjustable tether lines 806 and 807 may be added as well. Adjustable tether 806 may have one end coupled to spool motor 851 and the other end coupled to connection point 808, and adjustable tether 807 may have one end coupled to spool motor 852 and the other end coupled to connection point 808. As one side spool motor lets out a length of its line, the opposite side spool motor takes in a similar length. This acts to move the effective tether attachment point left or right along the lateral axis. Though this embodiment has been shown as corresponding to the UAV 202 of FIG. 2, it is understood that any of the embodiments of the present invention may incorporate similar adjustable tether modifications as well.

The flight components associated with these above embodiments include left and right pairs of elevon control surfaces on the trailing edge of the left and right sides of the wing, a flight control system, a stability augmentation system, a guidance and navigation system, a transponder, position and navigation lighting, and a collision avoidance system, for avoiding collisions with other wind-turbine air vehicles and/or other aircraft in general. Certain other components such as communications or intelligence surveillance equipment may be included in the system as well without departing from the scope of the invention.

The left and right sides of the wing include inboard and outboard elevons that combine the functions of flight vehicle ailerons and elevators. If both elevons on one side of the wing move in the opposite direction from the elevons on the other side of the wing, they serve as ailerons and control vehicle roll. If all four elevons move up or down in unison, they serve as elevators and control vehicle pitch. Any combination of pitch and roll may be commanded by independent control of each elevon. Yaw may be produced when the elevons on one side of the wing move in opposite directions. This increases drag on half of the wing, thus inducing yaw. Vehicle yaw may also be provided by differentially changing the drag produced by the wind turbines located at the vehicle wing tips. Slight changes in the pitch of each trailing rotor will cause slight changes in yaw that together with roll is required for turning (banking) the vehicle in a coordinated manner. This is especially important when the vehicle makes tight, high-G turns during the figure-eight maneuver.

Other traditional control authority devices can also be used such as spoilers, leading edge flaps, speed brakes, and rudders on the winglets.

Figure 9:
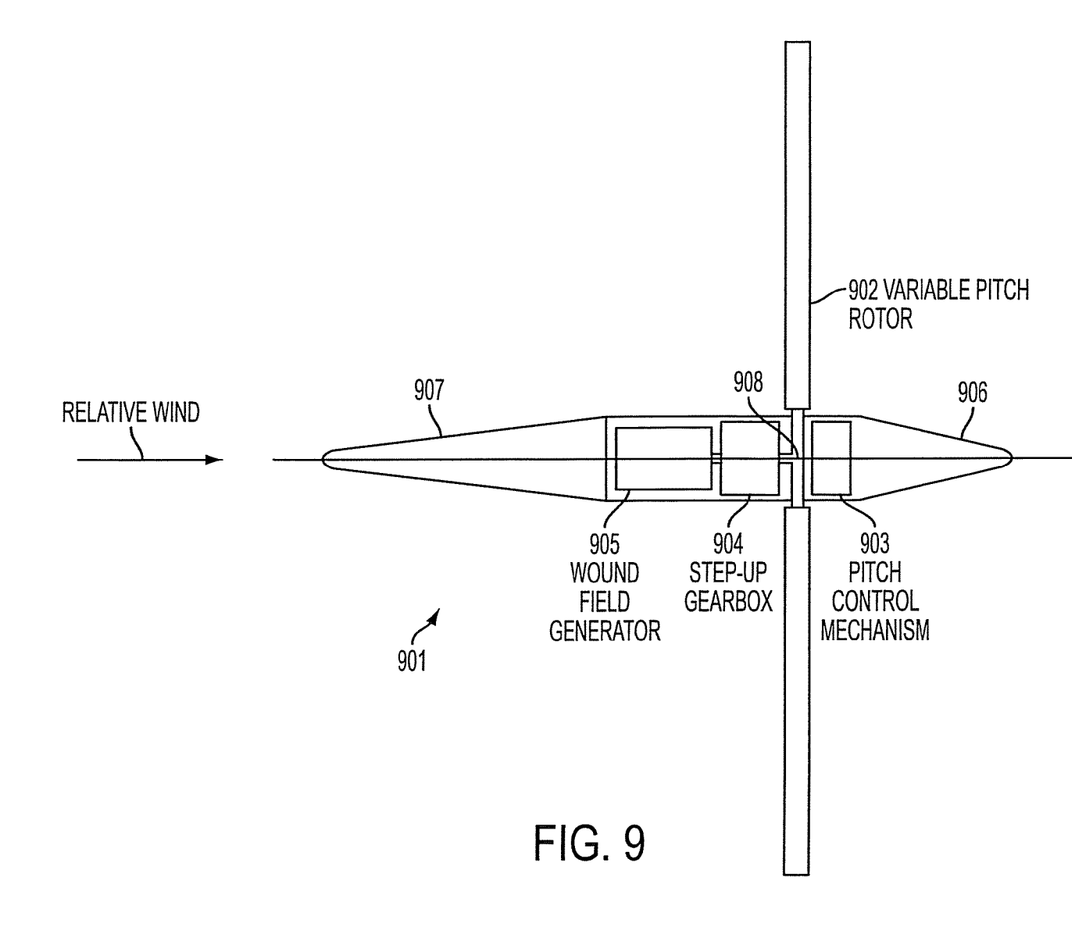
FIG. 9 is a schematic of the preferred wind turbine centerbody assembly.

FIG. 9 is a schematic of the preferred wind turbine centerbody assembly 901 comprising a rotor 902, rotor pitch control mechanism 903, two-stage gearbox 904, high-speed generator 905, lubrication/cooling system (not shown), brake (not shown), and composite structural elements including a nose cone 906, tail cone 907, and surface skin (not shown). Multiple wind turbine centerbody assemblies of the same design may be used on a single autonomous air vehicle, such as on the vehicles illustrated in FIGS. 3 and 4 herein. Each of the major components of the turbine centerbody assembly will now be described in further detail.

The rotor 902 is preferably a two-bladed, high-strength, light-weight carbon fiber and epoxy assembly. The root of each rotor blade is attached to a hub 908 that contains the rotor pitch control mechanism 903.

The rotor pitch control mechanism 903 controls rotor blade pitch from the full feathered position to the full flat pitch position. This device is similar to what is currently used in conventional turboprop-powered aircraft. The rotor pitch control mechanism 903 is spring-loaded to the feathered position (blades trailing with respect to air flow). Oil pressure from the lubrication system provides the source of fluid pressure for pitch control actuation. In the event of loss of oil pressure, the rotor blades 902 feather, rotation stops, and power-generation ceases. This prevents a catastrophic failure of the rotating components including the gearbox 904 and generator 905.

A brake can be used to lock the rotor in the stowed position and ensure that it does not drift. The two-bladed rotor 902 will be stowed in the parallel-to-the-wing (horizontal) position for takeoff and landing to prevent potential damage. The brake is also used to lock down a rotor 902 in the event the sister rotor becomes disabled. This helps to preclude any differential drag that may adversely affect vehicle flight stability.

Figure 10:
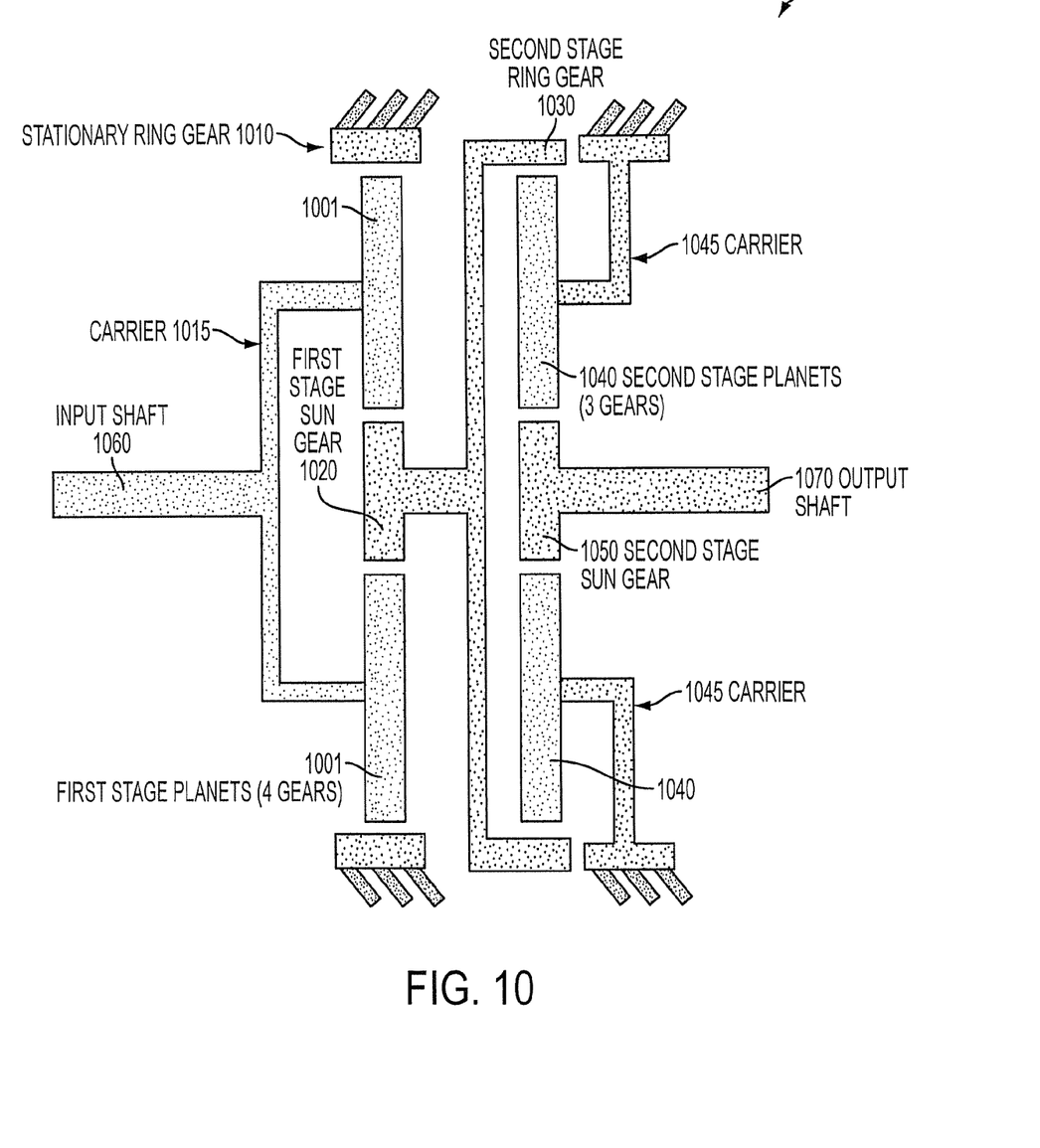
FIG. 10 is a schematic diagram of the preferred two-stage gearbox.

FIG. 10 is a schematic diagram of the preferred two-stage gearbox 904. The first stage is comprised of four planetary gears 1001, a stationary ring gear 1010, a planet carrier 1015, and a sun gear 1020. The second stage is comprised of a ring gear 1030, three planetary gears 1040, a planet gear carrier 1045, and a sun gear 1050. The input shaft 1060 drives the first-stage carrier 1015 which supports the first-stage planetary gears 1001. These gears are guided by the stationary ring gear 1010 and drive the first-stage sun gear 1020. The first-stage sun gear 1020 drives the second-stage ring gear 1030, which in turn drives three second-stage planetary gears 1040 supported by the second stage carrier 1045. These gears drive the second-stage sun gear 1050 that drives the output shaft 1070. The purpose of the gearbox is to step-up the speed of the wind turbine rotor in order to drive the generator at a higher speed. At the rated power of 1 megawatt, the rotor speed is 900 rpm. The two-stage gearbox increases this input speed to 15,000 rpm (16.7-to-1).

Figure 11:
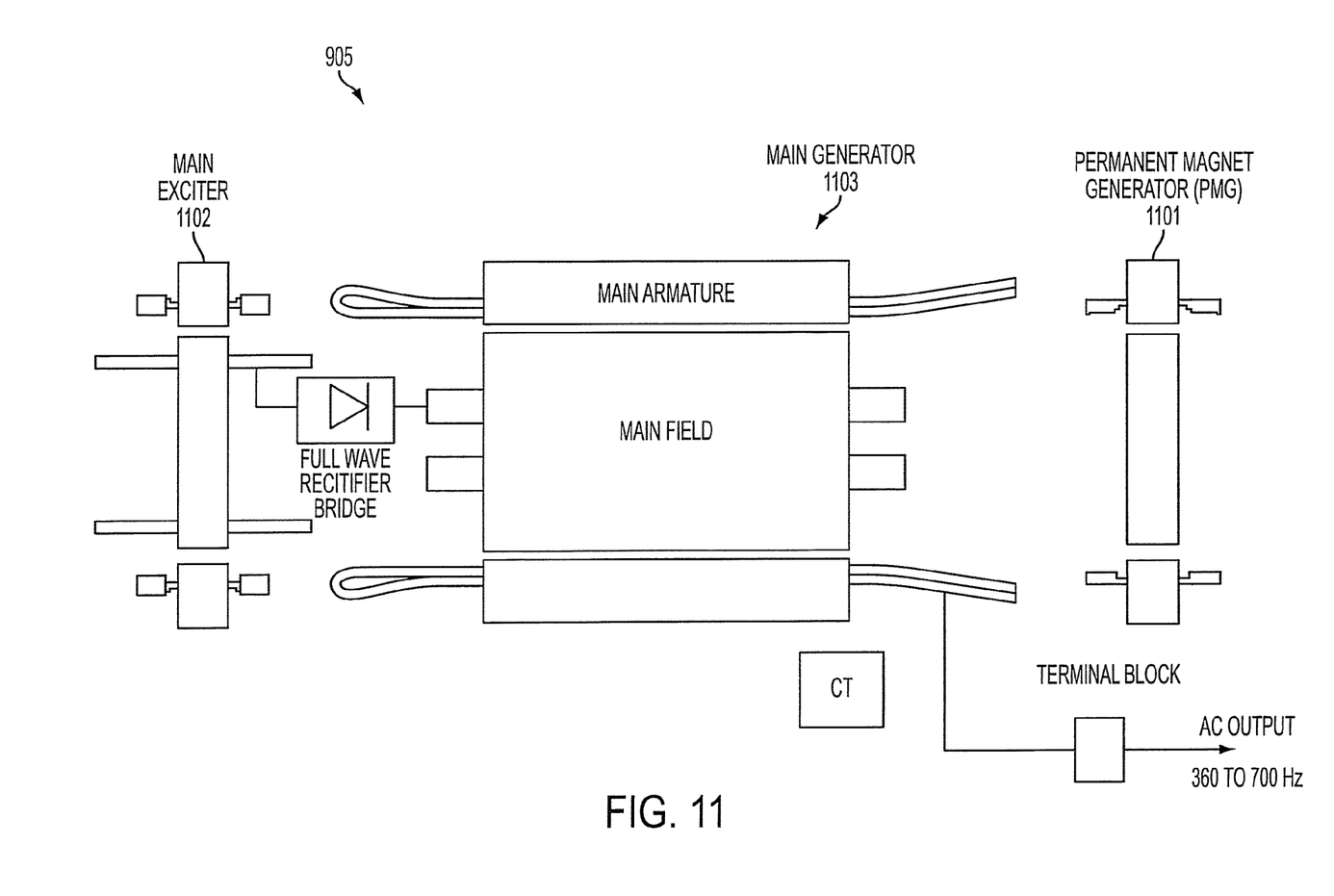
FIG. 11 is a schematic of the wound field generator, also known as a wound field synchronous machine.

FIG. 11 is a schematic of the wound field generator 905, also known as a wound field synchronous machine. The generator is designed to operate at high speed. The advantage of high speed operation is that the generator can produce high electrical power output in a compact, light-weight package. This is an important consideration for an airborne application due to the desire to minimize overall vehicle weight. The generator is comprised of three separate generators on a single shaft. The first stage 1101 is a small permanent magnet generator that supplies excitation power via a generator control unit (GCU) to a second stage 1102. The second stage 1102 is an exciter generator that provides main field excitation to the third stage 1103. The third stage 1103 is the main generator that provides the main power output. Advantages of this generator design include high power density, self excitation, easy voltage regulation, good transient performance, good fault protection via the GCU, and high reliability due to the absence of brushes or other contacting parts except for the bearings. Two or more generators can be paralleled on the tether conductors without power electronics with a simple diode bridge to generate high voltage DC. The generator can also be used as a motor if motor commutation electronics are included. Other high-speed generator types including permanent magnet and induction may be used instead of the wound field generator.

Using the generator 905 as a motor is one method in which the UAV can reach an appropriate altitude. Typical power flow through the conductors in the tether is reversed and the wind turbines act as propellers as the UAV launches and ascends toward altitude. Another method in which the UAV can reach altitude is by having the aerostat provide the necessary lift. In a third method, a helicopter or other manned or unmanned craft could release it from the desired altitude.

An included lubrication and cooling system is preferred. The lubrication system provides oil lubrication to gearbox and generator internal bearings and gears. The system preferably includes an air-to-liquid heat exchanger that maintains oil temperature within normal operating limits. The lubrication system also provides oil pressure to the rotor pitch control actuator.

Various arrangements and embodiments in accordance with the present invention have been described herein. It will be appreciated, however, that those skilled in the art will understand that changes and modifications may be made to these arrangements and embodiments as well as combinations of the various embodiments without departing from the true scope and spirit of the invention, which is defined by the following claims.

We claim:

1. A wind-driven electric power generating apparatus comprising:
    an air vehicle comprising:
        a flying wing having a direction of travel generally perpendicular to a longitudinal length of the flying wing;
        a wind power turbine coupled to a trailing edge of the wing, relative to the direction of travel, wherein the turbine comprises:
            a rotor, at least one rotor blade, and an electric power generator; and
    a tether comprising an insulated conductor, wherein the tether comprises at least a first end and a second end, and wherein the first end of the tether is coupled to the air vehicle and the second end of the tether is coupled to a terrestrial anchorage point on land or sea.

2. The apparatus of claim 1, wherein the flying wing includes an elevon control surface.

3. The apparatus of claim 1, wherein the air vehicle further comprises a wind power turbine coupled to a leading edge of the wing, relative to the direction of travel.

4. The apparatus of claim 1, wherein the wing comprises a spool motor;
    and wherein the tether is a first tether;
    and wherein the air vehicle further comprises a second tether with a first end coupled to an attachment point along the first tether and a second end coupled to the spool motor;
    and wherein the spool motor is adapted to lengthen or shorten the second tether.

5. The apparatus of claim 1, wherein the wind power turbine further comprises a rotor pitch control mechanism adapted to adjust pitch of the at least one rotor blade.

6. The apparatus of claim 1, wherein the wind power turbine further comprises a speed increasing gearbox coupled to the rotor and the electric power generator.

7. The apparatus of claim 1, wherein the rotor is ducted and includes a nested diffuser.

8. The apparatus of claim 1, further comprising a lighter-than-air object coupled along the tether between the first and the second end, wherein the lighter-than-air object provides lift to at least a portion of the tether.

9. A method for generating electric power, the method comprising:
    coupling an air vehicle to a terrestrial anchorage point using a tether,
        wherein the tether comprises an insulated conductor,
        and wherein the air vehicle comprises:
            a flying wing having a direction of travel generally perpendicular to a longitudinal length of the flying wing;
            a wind power turbine coupled to a trailing edge of the wing, relative to the direction of travel, wherein the turbine comprises:
                a rotor, at least one rotor blade, and an electric power generator; and
    performing in-flight airborne maneuvers that enable the air vehicle to consistently travel at speeds faster than the true wind speed, thereby rotating the wind power turbine and thus the generator.

10. The method of claim 9, wherein the flying wing includes an elevon control surface.

11. The method of claim 9, wherein the air vehicle further comprises a wind power turbine coupled to a leading edge of the wing, relative to the direction of travel.

12. The method of claim 9, wherein the wing comprises a spool motor;
    and wherein the tether is a first tether;
    and wherein the air vehicle further comprises a second tether with a first end coupled to an attachment point along the first tether and a second end coupled to the spool motor;
    and wherein the spool motor is adapted to lengthen or shorten the second tether.

13. The method of claim 9, wherein the turbine further comprises a rotor pitch control mechanism to adjust pitch of the at least one rotor blade.

14. The method of claim 9, wherein the wind power turbine further comprises a speed increasing gearbox to couple to the rotor and the electric power generator.

15. The method of claim 9, wherein the rotor is ducted and includes a nested diffuser.

16. The method of claim 9, further comprising a lighter-than-air object adapted to couple along the tether in-between the air vehicle and the ground or sea based anchorage point and provide lift to a portion of the tether.

17. The method of claim 9, wherein performing the in-flight airborne maneuvers comprises traveling in a circular path.

18. The method of claim 9, wherein performing the in-flight airborne maneuvers comprises traveling in a figure-eight path.

19. The method of claim 9, wherein the figure-eight path comprises a first generally circular path and a second generally circular path, and traveling in the figure-eight path comprises traversing the first circular path of the figure-eight path a plurality of times then traversing the second circular path of the figure-eight path a plurality of times in an opposite circular direction relative to the first circular path.

20. The method of claim 18, wherein the figure-eight path is inclined with respect to the ground, and wherein traveling in the figure-eight path comprises reversing direction during the downward portion of the path.

* * * * *